United States Patent
Ito et al.

(10) Patent No.: US 6,555,640 B1
(45) Date of Patent: Apr. 29, 2003

(54) PROCESS FOR PRODUCING METAL-CONTAINING RESIN AND COMPOSITION THEREOF

(75) Inventors: Kei Ito, Kanagawa (JP); Chikara Kawamura, Kanagawa (JP)

(73) Assignee: Kansai Paint Co., Ltd., Kanagawa (JP)

( * ) Notice: Subject to any disclaimer, the term of this patent is extended or adjusted under 35 U.S.C. 154(b) by 0 days.

(21) Appl. No.: 09/666,846

(22) Filed: Sep. 21, 2000

(51) Int. Cl.⁷ .................................................. C08F 2/00
(52) U.S. Cl. ........................... 526/207; 526/91; 526/95; 526/240; 526/317.1; 526/318.2; 526/319; 526/329.6; 524/779; 524/780; 524/783; 524/784; 524/785
(58) Field of Search ........................ 526/207, 95, 240, 526/430, 303.1, 307, 318.2, 91, 317.1, 319, 329.6; 524/779, 780, 783, 784, 785

(56) References Cited

U.S. PATENT DOCUMENTS

| | | | | |
|---|---|---|---|---|
| 2,820,777 A | * | 1/1958 | Suen et al. | 260/89.7 |
| 3,705,137 A | | 12/1972 | Kuwaharar et al. | |
| 4,954,562 A | * | 9/1990 | Anderson | 524/430 |
| 5,319,018 A | | 6/1994 | Owens et al. | |
| 5,962,608 A | * | 10/1999 | Ryang et al. | 522/81 |
| 6,211,301 B1 | | 4/2001 | Ogino et al. | |

FOREIGN PATENT DOCUMENTS

| | | |
|---|---|---|
| EP | 779 304 | 6/1997 |
| EP | 2 311 070 | 9/1997 |
| GB | 2 096 624 | 10/1982 |
| GB | 2 330 582 | 4/1999 |
| JP | 9 286933 | 11/1997 |
| JP | 10-60316 | 3/1998 |

* cited by examiner

Primary Examiner—Tayana Zalukaeva
(74) Attorney, Agent, or Firm—Rader, Fishman & Grauer PLLC

(57) ABSTRACT

Process that is capable of synthesizing a metal-containing resin having a good antifouling property in a short period of time without having such problems associated with the synthesis as gelation. The process for producing a metal-containing resin by conducting a copolymerization reaction of a monomer mixture (A) comprising 1 to 50% by weight of a carboxyl group-containing polymerizable unsaturated monomer (a) and 50 to 99% by weight of other polymerizable unsaturated monomer (b) in an organic solvent in the presence of water and an oxide or hydroxide of a metal having a valency of at least 2, wherein the amount of water is 1 to 30 parts by weight based on 100 parts by weight of the monomer mixture (A), and the formation of a metal carboxylate bond occurs together with the copolymerization of the monomer mixture (A); and an antifouling coating composition containing, as an active constituent, a metal-containing resin obtained by the production process.

19 Claims, No Drawings

PROCESS FOR PRODUCING METAL-CONTAINING RESIN AND COMPOSITION THEREOF

FIELD OF THE INVENTION

This invention relates to a process for producing a metal-containing resin and an antifouling coating composition containing this metal-containing resin as an active constituent.

BACKGROUND OF THE INVENTION

Heretofore, a resin containing a carboxylate of tin has been widely used as an antifouling coating binder. However, due to its toxicity, it has been strongly desired to switch from it to other resins. In recent years, a resin containing a carboxylate of copper or zinc has been mainly studied. In order to exhibit a long-term antifouling property, it was required to control the abrasion speed of a coating film. The assignee of the present application proposed a process which comprises reacting a resin having a carboxyl group and a polyalkylene glycol structure with an oxide or hydroxide of copper or zinc, as a process for producing a resin containing a carboxylate of copper or zinc which is capable of controlling the abrasion speed of a coating film and exhibiting a long-term antifouling property, as disclosed in Japanese Laid-Open Patent Publication No. 11-080255/1999.

SUMMARY OF THE INVENTION

However, since this process comprised the production of a carboxyl-group containing resin and the subsequent formation of a carboxylate of a metal such as copper or zinc by reacting the carboxyl group contained in the resin with an oxide or hydroxide of copper or zinc, a long total reaction time, such as 24 hours, was required for the synthesis of the carboxyl-group containing resin and the formation of the carboxylate, which is a problem of this process.

Further, when a resin having a metal carboxylate structure in the molecule was to be produced by a process of copolymerizing polymerizable unsaturated monomers having a metal carboxylate structure, there occurs the problem that gelation occurring at the time of copolymerization makes the synthesis difficult.

It is the object of the present invention to provide a process that is capable of synthesizing a metal-containing resin having a good antifouling property in a short period of time without having such problems associated with the synthesis as gelation.

The present inventors found that the metal-containing resin having a good antifouling property can be synthesized in a short period of time without having such problems associated with the synthesis as gelation by conducting the polymerization of a monomer mixture containing a carboxyl group-containing polymerizable unsaturated monomer in a specific organic solvent in the presence of water and an oxide or hydroxide of a metal and the formation of a carboxylate of a metal simultaneously. The present invention was completed by this finding.

Thus, according to the present invention, there is provided a process for producing a metal-containing resin by conducting a copolymerization reaction of a monomer mixture (A) comprising 1 to 50% by weight of a carboxyl group-containing polymerizable unsaturated monomer (a) and 50 to 99% by weight of other polymerizable unsaturated monomer (b) in an organic solvent in the presence of water and an oxide or hydroxide of a metal having a valency of at least 2, in which the amount of water is 1 to 30 parts by weight based on 100 parts by weight of the monomer mixture (A), and the formation of a metal carboxylate bond occurs together with the copolymerization of the monomer mixture (A).

Further, according to the present invention, there is also provided an antifouling coating composition containing, as an active constituent, a metal-containing resin produced by the above production process.

PREFERRED EMBODIMENT OF THE INVENTION

The present invention will be described in detail hereinafter.

First, description will be given to the process of the present invention for producing a metal-containing resin.

In the process of the present invention for producing a metal-containing resin, the monomer mixture (A) to be subjected to the copolymerization reaction comprises (a) a carboxyl group-containing polymerizable unsaturated monomer and (b) other polymerizable unsaturated monomer. Illustrative examples of the above carboxyl group-containing polymerizable unsaturated monomer (a) include (meth)acrylic acid, crotonic acid, itaconic acid, maleic acid and fumaric acid.

Illustrative examples of the above other polymerizable unsaturated monomer (b) include a polymerizable unsaturated monomer having a polyoxyalkylene structure represented by the following general formula (1):

$$-(C_mH_{2m}O)_n-R^1 \qquad (1)$$

(wherein $R^1$ is hydrogen or a linear, branched or cyclic alkyl or aralkyl group having 1 to 20 carbon atoms, m is an integer of 1 to 4, and n is an integer of 2 to 100); vinyl aromatic compounds such as styrene, α-methyl styrene, vinyltoluene and α-chlorostyrene; alkyl esters or cycloalkyl esters having 1 to 24 carbon atoms of acrylic acid or methacrylic acid such as methyl (meth)acrylate, ethyl (meth)acrylate, n-propyl (meth)acrylate, isopropyl (meth)acrylate, (n-, i-, t-)butyl (meth)acrylate, hexyl (meth)acrylate, cyclohexyl (meth)acrylate, 2-ethylhexyl (meth)acrylate, n-octyl (meth)acrylate, decyl (meth)acrylate, lauryl (meth)acrylate, stearyl (meth)acrylate and isobornyl (meth)acrylate; 2-hydroxyethyl (meth)acrylate, 2-methoxyethyl (meth)acrylate, perfluoroalkyl (meth)acrylates such as perfluorobutylethyl (meth)acrylate, perfluoroisononylethyl (meth)acrylate and perfluorooctylethyl (meth)acrylate; fluoroolefins represented by the general formula $CX_2=CX_2$ (wherein the four Xs may be the same or may be different, and can be H, Cl, Br, F, an alkyl group or a haloalkyl group, provided that at least one F is included in the formula) such as $CF_2=CF_2$, $CHF=CF_2$, $CH_2=CF_2$ and $CClF=CF_2$; and polymers which comprise at least one of the above monomers and have a copolymerizable double bond at one end, e.g., macromonomers.

In the polymerizable unsaturated monomer having a polyoxyalkylene structure represented by the above general formula (1), the polyoxyalkylene structure has the effect of improving wearing properties without impairing the physical properties of a coating film. In the formula (1), it is appropriate that m is an integer of 1 to 4, preferably 2 or 3 and that the number of alkylene glycol repeating units, n, is an integer of 2 to 100, preferably 2 to 20. When m is larger than 4 or n is larger than 100, there cannot be seen the effect of improving the wearing properties of the antifouling coating film.

Illustrative examples of the polymerizable unsaturated monomer having the polyoxyalkylene structure include (meth)acrylic ester having the polyoxyalkylene structure represented by the above formula (1) in the side chain, as specifically exemplified by methoxypolyethylene glycol (meth)acrylate, nonylphenoxypolyethylene glycol (meth)acrylate and methoxypolypropylene glycol (meth)acrylate.

Illustrative examples of the organic solvent used in the copolymerization reaction in the present invention include alcohol solvents such as methanol, ethanol, n-propanol, i-propanol and (n-, i-, t-)butanol; ester solvents such as ethyl acetate, propyl acetate, butyl acetate, amyl acetate, methoxy butyl acetate, methyl acetoacetate, ethyl acetoacetate, methyl cellosolve acetate, cellosolve acetate, diethylene glycol monomethyl ether acetate and carbitol acetate; ketone solvents such as acetone, methyl ethyl ketone, methyl isobutyl ketone and cyclohexanone; ether solvents such as dioxane, ethylene glycol diethyl ether, ethylene glycol dibutyl ether, diethylene glycol diethyl ether, ethylene glycol monoethyl ether, ethylene glycol monobutyl ether and ethylene glycol monopropyl ether; aromatic hydrocarbon solvents such as toluene, xylene, and high-boiling petroleum solvents such as SWASOL 1000 and SWASOL 1500 (products of Cosmo Oil Co., Ltd.) and SOLVESSO 100 and SOLVESSO 150 (products of Esso Oil Co., Ltd.); and mineral spirits. In the process of the present invention, it is suitable from the viewpoint of dispersibility of an oxide or hydroxide of a metal (hereinafter referred to as "metal compound") in the organic solvent that at least one solvent selected from the above alcohol solvents, ester solvents, ketone solvents and ether solvents is contained in a total amount of 50% by weight of the organic solvent. In the process of the present invention, the copolymerization of the monomer mixture (A) is carried out in the above organic solvent in the presence of water and a metal compound having a valency of at least 2. The metal compound having a valency of at least 2 is not limited to particular kinds but is preferably an oxide or hydroxide of at least one metal selected from the group consisting of copper, zinc, calcium, magnesium and iron from the viewpoint of costs, toxicity, reactivity and the like. Illustrative examples of the oxide and hydroxide include copper oxide, zinc oxide, calcium oxide, calcium hydroxide and magnesium oxide.

In the present invention, the copolymerization of the monomer mixture (A) may be carried out by radical polymerization. In the copolymerization reaction, a radical polymerization initiator may be suitably used. Illustrative examples of the radical polymerization initiator that can be used include peroxides such as benzoyl peroxide, di-t-butyl hydroperoxide, t-butyl hydroperoxide, cumyl peroxide, cumene hydroperoxide, diisopropyl benzene hydroperoxide, t-butyl peroxybenzoate, lauroyl peroxide, acetyl peroxide and t-butylperoxy-2-ethylhexoate; and azo compounds such as α,α'-azobisisobutyronitrile, 2,2'-azobis(2-methylbutyronitrile), azobisdimethylpentyronitrile and azobiscyclohexanecarbonitrile. The amount of the radical polymerization initiator used is not particularly limited. In general, it is preferably in an amount of 0.1 to 20 parts by weight based on 100 parts by weight of the monomer mixture (A). In the process of the present invention for producing a metal-containing resin, the copolymerization reaction of the monomer mixture (A) can be carried out by causing the monomer mixture (A) to react generally at 50 to 200° C. around 5 to 20 hours in the organic solvent in the presence of 1 to 30 parts by weight of water based on 100 parts by weight of the monomer mixture (A) and a metal compound having a valency of at least 2, and in the presence of the radical polymerization initiator as required, and the formation of a metal carboxylate bond can be carried out together with the copolymerization reaction. At the beginning of the reaction, a powdery metal compound is merely dispersed in a reaction solution; however, as the reaction proceeds, the reaction solution becomes transparent as a whole.

Water has not only the effect of promoting the reaction but also the effect of prohibiting gelation. When the amount of water is smaller than 1 part by weight based on 100 parts by weight of the monomer mixture (A), such effects can hardly be expected. On the other hand, when the amount of water is larger than 30 parts by weight, the above effects are not further improved; on the contrary, miscibility of water with the organic solvent deteriorates, thereby making the reaction system non-uniform, even though such amount of water may be employed. After the completion of the reaction, excess water that does not dissolve in the system can be easily removed by such processes as pressure reduction, decantation and heating.

It is appropriate that the amount of the above metal compound having a valency of at least 2 is 0.2 to 10 gram molar amount, preferably 0.5 to 2 gram molar amount, per gram equivalent of the carboxyl group based on the carboxyl group-containing polymerizable unsaturated monomer (a) contained in the monomer mixture (A), from the viewpoints of the ease of the metal carboxylate bond reaction, the reduction of the reaction time and the long-time wearing properties of a coating film formed by using the obtained metal-containing resin as a binder.

The above metal-containing resin obtained by the process of the present invention preferably has a weight average molecular weight of 1,000 to 200,000, more preferably 3,000 to 100,000, from the viewpoints of the drying property, finished appearance, weatherability, durability, wearing properties and antifouling property of the obtained coating film. Further, it is appropriate that the above metal-containing resin has a resin acid value of 10 to 300 mg KOH/g, preferably 20 to 200 mg KOH/g, more preferably 50 to 150 mg KOH/g, from the viewpoints of the wearing properties and, antifouling property of the obtained coating film, and good handling properties (due to suppressed viscosity).

The antifouling coating composition of the present invention contains the above metal-containing resin obtained by the process of the present invention as an active or effective ingredient or constituent. Although the antifouling coating composition can be attained by using only an organic solvent solution containing the metal-containing resin, it may also contain an antifouling agent, an organic solvent, a pigment, a dispersant, a plasticizer and other additives that are commonly used in an antifouling coating as required from the viewpoint of antifouling property.

Illustrative examples of the above antifouling agent include copper-based antifouling agents such as cuprous oxide, copper thiocyanate and copper powder; nitrogen-containing sulfur-based antifouling agents such as zinc ethylene bis(dithiocarbamate) and tetramethyl thiuramdisulfide; organotin antifouling agents such as bis(triphenyltin) oxide, bis(tributyltin) oxide, tributyltin acetate, tributyltin chloride, triphenyltin hydroxide, triphenyltin versatate and bis(tributyltin) α,α'-dibromosuccinate; disinfectants such as a nitrile-based compound, a benzothiazole-based compound, a triazine-based compound, an urea-based compound, an isothiazoline-based compound, a maleimide-based compound, an N-haloalkylthio-based compound, a tetracycline-based compound, Zinc Pyrithione, and a pyridine-based compound such as triphenyl boron pyridine salt; and zinc oxide. It is appropriate that the above antifouling agent is added in an amount of not more than 400 parts by weight, preferably 50 to 300 parts by weight, more preferably 100 to 250 parts by weight based on 100 parts by weight of the resin solid content of the metal-containing resin.

When the above antifouling agent is powdery, it can be stirred to be mixed into the solution of the metal-containing resin as it is. Although the method of carrying out the mixing is not particularly limited, the method is generally appropriate that comprises forming the antifouling agent into a paste-like substance and mixing the paste-like substance into the solution of the metal-containing resin. Alternatively, the antifouling agent may be kneaded with the solution of a metal-containing resin before use.

The method of forming an antifouling coating film by using the antifouling coating composition of the present invention is not particularly limited and may be a conventionally known method. Specifically, the antifouling coating composition of the present invention can be applied by such means as brush coating, spray coating, roller coating or immersion of the surface of the base material of an underwater structure (such as a ship, port facilities or a buoy).

EXAMPLES

The present invention will be described in detail with reference to Examples hereinafter. In the following description, "part(s)" and "%" will indicate "part(s) by weight" and "% by weight", respectively.

Example 1

Into a reactor equipped with a thermometer, a thermostat, an agitator, a reflux condenser and a dropping pump were charged 35 parts of butyl acetate and 35 parts of n-butanol. While the content of the reactor was agitated, 7.5 parts of coxide and 5.3 parts of water were also added to disperse the zinc oxide in the solvent. Then, after the content of the reactor was heated to 100° C. under agitation, 108 parts of a mixture of the monomers and polymerization initiator shown in Table 1 were added dropwise at a constant speed using the dropping pump in 4 hours with the temperature maintained at 100° C. After the completion of the addition, the content of the reactor was maintained at 100° C. for 30 minutes, during which the agitation was continued. Thereafter, the solution obtained by dissolving 1 part of an additional polymerization initiator in 6 parts of butyl acetate and 6 parts of n-butanol was added dropwise thereto at a constant speed in 1 hour. The resulting content of the reactor was further agitated at 100° C. for another 6 hours to give a homogeneous, transparent resin solution containing 50% by weight of a non-volatile matter and having a Gardner viscosity of M.

Examples 2 and 3 and Comparative Examples 1 to 3

Resin solutions were obtained in the same manner as in Example 1 except that the compositions of mixtures of solvents, water, monomers and polymerization initiators were changed accordingly as shown in Table 1. The property values of the obtained resin solutions are also shown in Table 1.

Comparative Example 4

Into a reactor equipped with a thermometer, a thermostat, an agitator, a reflux condenser and a dropping pump were charged 23 parts of xylene, 30 parts of butyl acetate and 30 parts of n-butanol. Then, after the content of the reactor was heated to 105° C. under agitation, 108 parts of a mixture of the monomers and polymerization initiator shown in Table 1 were added dropwise at a constant speed using the dropping pump in 4 hours with the temperature maintained at 105° C. After the completion of the addition, the content of the reactor was maintained at 105° C. for 30 minutes, during which the agitation was continued. Thereafter, the solution obtained by dissolving 1 part of an additional polymerization initiator in 6 parts of xylene was added dropwise thereto at a constant speed for 1 hour. After the resulting content of the reactor was further maintained at 105° C. for another 1 hour, 7.3 parts of zinc oxide, 5.0 parts of water, 5.5 parts of butyl acetate and 5.5 parts of n-butanol were added to the resulting resin solution, which was then kept under agitation at 100° C. for 20 hours to give a transparent resin solution having a Gardner viscosity of RS. The property values of the obtained resin solution are also shown in Table 1.

The antifouling property test was conducted on the resin solutions obtained in the above Examples 1 to 3 and Comparative Examples 2 and 4, on the basis of the following method. The results of the test are shown in the following Table 1.

Method of Testing Antifouling Property

The resin solutions obtained in Examples and Comparative Examples were applied to aluminum plates having a size of 100 mm×300 mm in such amounts that the coating films have a thickness of 100 μm when dried. After being dried at room temperature, the aluminum plates were immersed in the sea water of Suruga bay at a depth of 1 m, and the antifouling properties of the coating films after 6 months and after 12 months were evaluated in terms of organism fouling area ratio (%).

TABLE 1

|  |  |  | Examples | | | Comparative Examples | | | |
|---|---|---|---|---|---|---|---|---|---|
|  |  |  | 1 | 2 | 3 | 1 | 2 | 3 | 4 |
| Composition | | | | | | | | | |
| Monomers | Carboxyl-Group Containing Monomer | Methacrylic Acid | 15.3 | 15.3 | 20.0 | 15.3 | 15.3 | 15.3 | 15.3 |
|  | Other Monomers | Ethyl Acrylate | 44.7 | 44.7 | 80.0 | 44.7 | 44.7 | 44.7 | 44.7 |
|  |  | Methoxy Ethylacrylate | 40.0 | 40.0 |  | 40.0 | 40.0 | 40.0 | 40.0 |
|  |  | Zinc Methacrylate |  |  |  |  |  | 21.0 |  |
| Polymerization Initiator |  | 2,2'-Azobis(2-Methylbutyronitrile) | 8.0 | 8.0 | 8.0 | 8.0 | 8.0 | 8.0 | 8.0 |
| Additional Polymerization Initiator |  | 2,2'-Azobis(2,4-Dimethylpentyronitrile) | 1.0 | 1.0 | 1.0 | 1.0 | 1.0 | 1.0 | 1.0 |
| Solvents |  | Butyl Acetate | 52.0 | 75.0 | 64.5 |  | 52.0 | 52.0 | 35.5 |
|  |  | N-Butanol | 48.0 |  | 60.5 |  | 48.0 | 48.0 | 35.5 |
|  |  | I-Propyl Alcohol |  | 25.0 |  |  |  |  |  |
|  |  | Xylene |  |  |  | 100.0 |  |  | 29.0 |

TABLE 1-continued

|  |  |  | Examples | | | Comparative Examples | | | |
|---|---|---|---|---|---|---|---|---|---|
|  |  |  | 1 | 2 | 3 | 1 | 2 | 3 | 4 |
| Metal Compound | Zinc Oxide | | 7.3 | 7.3 | 7.3 | 7.3 | 7.3 | 7.3 | 7.3 |
| Water | Deionized Water | | 5.0 | 5.0 | 5.0 | 5.0 |  | 5.0 | 5.0 |
| Property Values | | | | | | | | | |
| Non-Volatile Matter (%) | | | 50.3 | 50.0 | 45.5 |  | 50.0 |  | 50.7 |
| Appearance | | | Trans-parent | Trans-parent | Trans-parent | Scorched | Whitened | Gelled | Trans-parent |
| Gardner Viscosity | | | LM | Y | UT |  | A |  | RS |
| Production Time (Hour) | | | 9 | 13 | 11 |  | 9 |  | 22 |
| Organism Fouling Area Ratio (%) | | After 6 Months | 0 | 0 | 0 |  | 50 |  | 0 |
|  |  | After 12 Months | 0 | 0 | 0 |  | 90 |  | 0 |

Further, antifouling coatings were prepared according to the compositions shown in the following Table 2 by using the resin solutions and antifouling agent components obtained in the above Examples 1 to 3 and Comparative Example 4, and an antifouling property test was conducted on the antifouling coatings in accordance with the following method for testing the antifouling property of a coating. The results of the test are shown in the following Table 2.

Method for Testing Antifouling Property of Coating

Testing plates were prepared by subjecting iron plates having a size of 100 mm×300 mm×3.2 mm to sandblasting (ISO Sa3.0) and applying an epoxy polyamide resin coating (100 μm×2) to the iron plates for corrosion protection. To the testing plates were applied antifouling coatings prepared according to the compositions shown in Table 2 twice in such amounts that the coating films had a thickness of 125 μm when dried. The resulting testing plates were then dried at 20° C. and a humidity of 75% for 7 days to prepare coated plates. These coated plates were immersed either in the sea water offshore the Toba-city of Mie-prefecture or in the sea water offshore the Shimizu-city of Shizuoka-prefecture at a depth of 1 m, and the antifouling properties of the coating films after 12 months and after 24 months were evaluated in terms of organism fouling area ratio (%). The smaller the organism fouling area ratio, the better the antifouling property. The results of the test are shown in the following Table 2.

TABLE 2

|  |  | C.Ex.1 | C.Ex.2 | C.Ex.3 | C.Ex.4 | C.Ex.5 |
|---|---|---|---|---|---|---|
| Resin Solution Obtained in Example 1 | | 39.8 | | | | |
| Resin Solution Obtained in Example 2 | | | 40.0 | | | |
| Resin Solution Obtained in Example 3 | | | | 44.0 | | |
| Resin Solution Obtained in Comparative Example 4 | | | | | 39.4 | |
| 70% Rosin | | | | | | 20.0 |
| LAROFLEX (*1) | | | | | | 6.0 |
| Cuprous Oxide | | 40.0 | 40.0 | 40.0 | 40.0 | 40.0 |
| Iron Oxide Red | | 5.0 | 5.0 | 5.0 | 5.0 | 5.0 |
| Talc | | 5.0 | 5.0 | 5.0 | 5.0 | 5.0 |
| Bentonite | | 1.0 | 1.0 | 1.0 | 1.0 | 1.0 |
| AEROSIL 2000 (*2) | | 1.0 | 1.0 | 1.0 | 1.0 | 1.0 |
| Xylene | | Diluted with Viscosity Adjusted | | | | |
| Organism Fouling Area Ratio (%) | After 12 Months Offshore Toba City | 0 | 0 | 0 | 0 | 3 |
|  | After 24 Months Offshore Toba City | 0 | 0 | 0 | 0 | 30 |
|  | After 12 Months Offshore Shimizu City | 0 | 0 | 0 | 0 | 5 |
|  | After 24 Months Offshore Shimizu City | 0 | 0 | 0 | 0 | 50 |

C.Ex. Comparative Example.
(*1) LAROFLEX product of BASF A.G. of Germany, trade name, copolymer resin of vinyl chloride and vinyl isobutyl ether.
(*2) AEROSIL 2000 product of Degussa Co., Ltd., fine silica powder.

According to the process of the present invention, a metal-containing resin can be produced industrially very easily and produced faster than when the conventional production process is used. Further, an antifouling coating composition containing the metal-containing resin obtained by the process of the present invention as an active constituent is effective for maintaining an antifouling property over a long period of time. The disclosure of Japanese Patent Application No. 11-273923 filed Sep. 28, 1999, including specification, drawings and claims are herein incorporated by reference in its entirety.

What is claimed is:

1. A process for producing a liquid coating solution containing a metal-containing resin, which comprises:
   conducting a copolymerization reaction of a monomer-containing mixture (A) comprising:
   (a) 1 to 50% by weight of a carboxyl group-containing polymerizable unsaturated monomer;
   (b) 50 to 99% by weight of other polymerizable unsaturated monomer;
   (c) an organic solvent in the presence of water; and
   (d) an oxide or hydroxide of a metal having a valency of at least 2,
   wherein the amount of water is 1 to 30 parts by weight based on 100 parts by weight of the monomer mixture (A), and the formation of a metal carboxylate bond occurs together with the copolymerization of the monomer mixture (A).

2. The process for producing a metal-containing resin according to claim 1, wherein the metal in the oxide or hydroxide of a metal having a valency of at least 2 is at least one metal selected from the group consisting of copper, zinc, calcium, magnesium and iron.

3. The process for producing a metal-containing resin according to claim 1, wherein the amount of the oxide or hydroxide of a metal having a valency of at least 2 is 0.2 to 10 gram molar amount per gram equivalent of the carboxyl group contained in the monomer mixture (A).

4. The process for producing a metal-containing resin according to claim 1, wherein the organic solvent contains at least one solvent selected from the group consisting of an alcohol solvent, an ester solvent, a ketone solvent and an ether solvent, in a total amount of at least 50% by weight of the organic solvent.

5. The process for producing a metal-containing resin according to claim 1, wherein the weight average molecular amount of the resin obtained by the polymerization of the monomer mixture (A) is 1,000 to 200,000.

6. The process for producing a metal-containing resin according to claim 1, wherein as the other polymerizable unsaturated monomer (b), a polymerizable unsaturated monomer having a polyoxyalkylene structure represented by the following formula (1):

$$—(C_mH_{2m}O)_n—R^1 \qquad (1)$$

in a molecule is contained in an amount of not more than 80% by weight based on the monomer mixture (A), wherein $R^1$ is hydrogen or a linear, branched or cyclic alkyl or aralkyl group having 1 to 20 carbon atoms, m is an integer of 1 to 4, and n is an integer of 2 to 100.

7. The process for producing a metal-containing resin according to claim 1, wherein the organic solvent contains at least 25% by weight of an alcohol solvent and at least 25% by weight of an ester solvent.

8. The process for producing a metal-containing resin according to claim 2, wherein the amount of the oxide or hydroxide of a metal having a valency of at least 2 is 0.2 to 10 gram molar amount per gram equivalent of the carboxyl group contained in the monomer mixture (A).

9. The process for producing a metal-containing resin according to claim 2, wherein the organic solvent contains at least one solvent selected from the group consisting of an alcohol solvent, an ester solvent, a ketone solvent and an ether solvent, in a total amount of at least 50% by weight of the organic solvent.

10. The process for producing a metal-containing resin according to claim 2, wherein the weight average molecular amount of the resin obtained by the polymerization of the monomer mixture (A) is 1,000 to 200,000.

11. The process for producing a metal-containing resin according to claim 2, wherein as the other polymerizable unsaturated monomer (b), a polymerizable unsaturated monomer having a polyoxyalkylene structure represented by the following formula (1):

$$—(C_mH_{2m}O)_n—R^1 \qquad (1)$$

in a molecule is contained in an amount of not more than 80% by weight based on the monomer mixture (A), wherein $R^1$ is hydrogen or a linear, branched or cyclic alkyl or aralkyl group having 1 to 20 carbon atoms, m is an integer of 1 to 4, and n is an integer of 2 to 100.

12. The process for producing a metal-containing resin according to claim 2, wherein the organic solvent contains at least 25% by weight of an alcohol solvent and at least 25% by weight of an ester solvent.

13. The process for producing a metal-containing resin according to claim 3, wherein the organic solvent contains at least one solvent selected from the group consisting of an alcohol solvent, an ester solvent, a ketone solvent and an ether solvent, in a total amount of at least 50% by weight of the organic solvent.

14. The process for producing a metal-containing resin according to claim 3, wherein the weight average molecular amount of the resin obtained by the polymerization of the monomer mixture (A) is 1,000 to 200,000.

15. The process for producing a metal-containing resin according to claim 3, wherein as the other polymerizable unsaturated monomer (b), a polymerizable unsaturated monomer having a polyoxyalkylene structure represented by the following formula (1):

$$—(C_mH_{2m}O)_n—R^1 \qquad (1)$$

in a molecule is contained in an amount of not more than 80% by weight based on the monomer mixture (A), wherein $R^1$ is hydrogen or a linear, branched or cyclic alkyl or aralkyl group having 1 to 20 carbon atoms, m is an integer of 1 to 4, and n is an integer of 2 to 100.

16. The process for producing a metal-containing resin according to claim 3, wherein the organic solvent contains at least 25% by weight of an alcohol solvent and at least 25% by weight of an ester solvent.

17. An antifouling coating composition containing, as an active constituent, a metal-containing resin produced by the process of claim 1.

18. An antifouling coating composition containing, as an active constituent, a metal-containing resin produced by the process of claim 2.

19. An antifouling coating composition containing, as an active constituent, a metal-containing resin produced by the process of claim 3.

* * * * *